United States Patent [19]
Campagnolo

[11] Patent Number: 5,795,036
[45] Date of Patent: Aug. 18, 1998

[54] BICYCLE REAR WHEEL

[75] Inventor: Valentino Campagnolo, Vicenza, Italy

[73] Assignee: Campagnolo S.r.L., Vicenza, Italy

[21] Appl. No.: 645,869

[22] Filed: May 14, 1996

[30] Foreign Application Priority Data

May 26, 1995 [IT] Italy ................... TO95A0425
Dec. 29, 1995 [IT] Italy ................... TO95A1058

[51] Int. Cl.⁶ ............................................. B60B 1/14
[52] U.S. Cl. ............................................. 301/59; 301/61
[58] Field of Search ........................... 301/55, 56, 57, 301/58, 59, 61, 124, 110.5

[56] References Cited

U.S. PATENT DOCUMENTS

| | | | |
|---|---|---|---|
| 317,494 | 5/1885 | Briggs | 301/59 |
| 473,426 | 4/1892 | Morgan | 301/61 |
| 502,500 | 8/1893 | Perkins | 301/58 |
| 556,124 | 3/1896 | Wolff | 301/61 X |
| 582,486 | 5/1897 | Rowe | 301/61 X |
| 612,323 | 10/1898 | Fraser | 301/61 |
| 705,567 | 7/1902 | Edwards | 301/58 X |
| 748,684 | 1/1904 | Andersen et al. | 301/58 |
| 2,280,936 | 4/1942 | Swanson | 301/110.5 X |
| 5,429,421 | 7/1995 | Watson | 301/59 X |

FOREIGN PATENT DOCUMENTS 1083341  1/1955  France ...................... 301/59

Primary Examiner—Russell D. Stormer
Attorney, Agent, or Firm—Sughrue, Mion, Zinn, Macpeak & Seas, PLLC

[57] ABSTRACT

The hub of a rear wheel of a race bicycle is deprived of radial flanges for connection to the spokes. The spokes have straight end portions, which are not bent in an elbow-like fashion, and are received in respective front cavities formed on the end surfaces of the hub. Force distributing members are preferably interposed between the enlarged heads of the spokes and the cooperating abutment surfaces. Axial retainers may be provided to prevent the end portions of the spokes from moving axially out of the respective cavities.

5 Claims, 4 Drawing Sheets

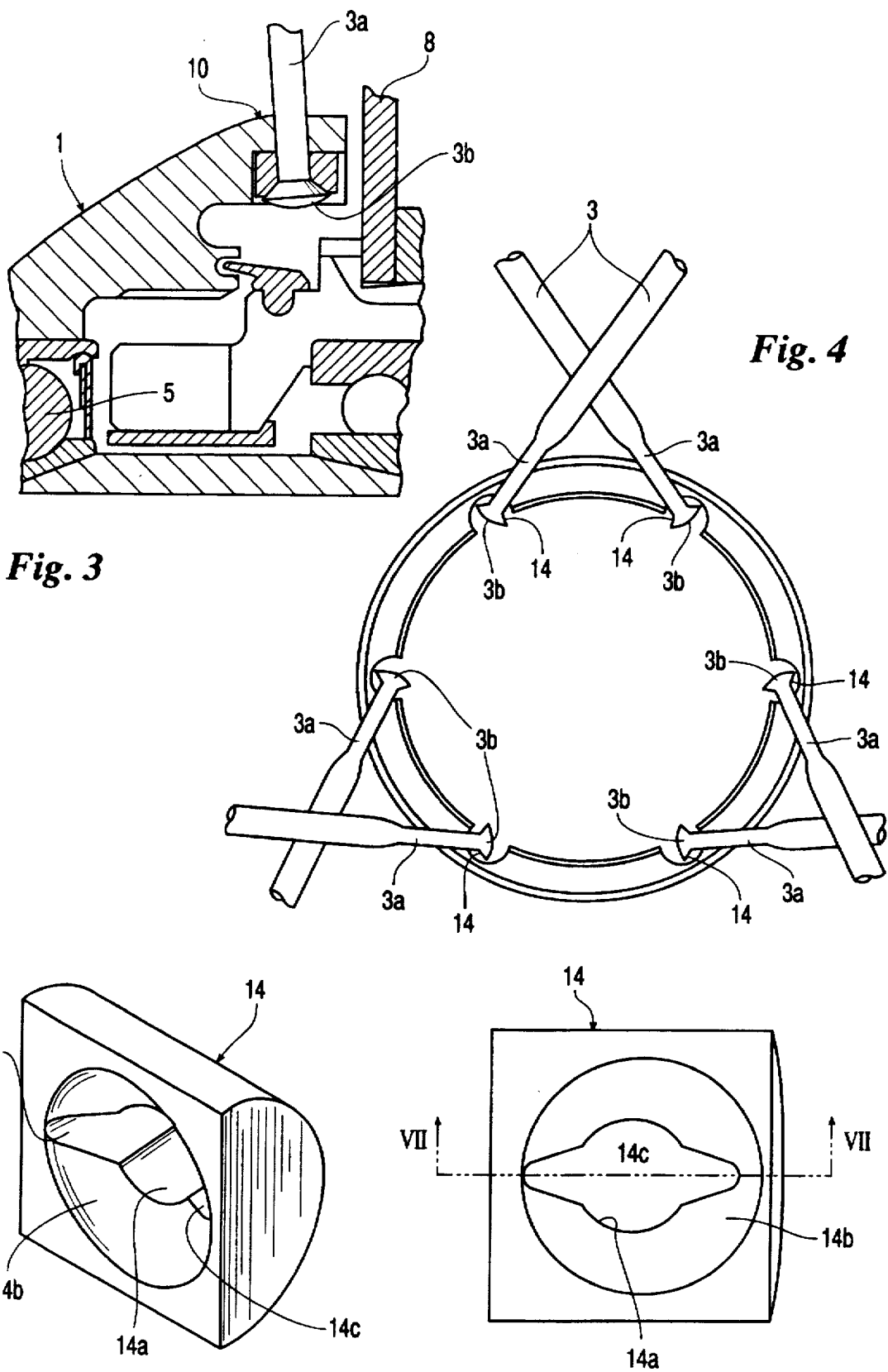

BICYCLE REAR WHEEL

BACKGROUND OF THE INVENTION

The present invention relates to rear wheels for bicycles, particularly race bicycles. In order to provide best performances during a race, the wheel must satisfy various needs. First of all, it must have very good aerodynamical characteristics. In the conventional rear wheels, the wheel hub is provided at its ends with radial flanges having axial bores for engagement of the end portions of the wheel spokes, which are bent in an elbow-like fashion and are alternatively arranged on the two sides of the radial flange. With such an arrangement, each projects from the flange, thus generating air vortices which decrease the aerodynamical performance of the wheel.

A further need is that to ensure a high transverse rigidity of the wheel in order to avoid that part of the force on the pedals which is wasted in a deformation of the wheel, before the latter is caused to advance. The power action on the pedals in any race condition is transmitted alternatively to the right and left pedals. Therefore, during the pedal movement, a bending torque in a direction transverse to the longitudinal axis of the bicycle is alternatively generated on the right and left side. The application of this bending torque causes each time a transverse deformation of the wheel, which, as discussed, causes a waste of energy and hence a shorter forward movement. It has been further demonstrated that, on the basis of the configuration of the human body, the greater thrust to the pedal is provided during a first angle of 15°–20° of rotation, starting from the uppermost position. A transverse deformation of the wheel involves therefore a waste of thrust just during the most efficient portion of the pedal movement.

In order to decrease as much as possible the transverse flexibility of the wheel, i.e. the possibility that the wheel rim is displaced transversally with respect to the hub as a result of a deformation of the spokes and the rim, it is desirable that the inclination of the spokes of each series connected at each end of the hub with respect to a plane orthogonal to the hub axis be as great as possible. However, in conventional wheels, at the end of the hub adjacent to the sprockets, this inclination is limited by the interference between the elbow-like bent end portions of the spokes and the immediately adjacent sprocket. As already discussed, in these conventional wheels, said elbow-like portions engage the holes of the radial flange alternatively on one side and the other. Therefore, the elbow-like portions which engage the bores of the radial flange from the outside, are closer to the sprockets and therefore have an inclination which is limited by the need to avoid the interference with the sprockets. As a result of this, the inclination of the spokes whose end portions engage the bores of the radial flange from the inside is even more limited. Thus, the transverse flexibility of the wheel is relatively high.

Finally, there is the need to provide wheels which are light. It is indeed known that the wheels affect, because of their rotary and advancing movement, the energy requested to move the bicycle by the double of their weight.

SUMMARY OF THE INVENTION

The object of the present invention is that to provide a bicycle rear wheel which is able to satisfy simultaneously all the above indicated needs.

In view of achieving this object, the invention provides a bicycle rear wheel, comprising a hub and two series of spokes for connecting the ends of the hub to the wheel rim, characterized in that both the ends of the hub have no radial flanges for connection to the spokes, in that at each of its ends, the hub has a front annular surface having a plurality of front cavities extending throughout the whole radial dimension of said front annular surface, and in that each spoke has a straight end portion, which is not bent in an elbow, connected to the hub, which is received within a respective cavity of said front cavities and has an enlarged head which rests against a force distributing member interposed between the head and the inner surface of the respective end of the hub.

Thus, in the wheel according to the invention, all the spokes connected to each end of the hub are arranged in the same plane and have no elbow-like portions which may generate air vortices with detriment for the aerodynamical characteristics of the wheel. The aerodynamical performances are further increased due to the elimination of the conventional radial flange at both ends of the hub. Therefore, the latter has a front cross-section which is reduced in dimension and more favourable to the air flow.

Furthermore, due to the arrangement of the spokes on the same plane, the inclination thereof may be chosen at a satisfactory value for all the wheel spokes, which greatly increases the transverse rigidity of the wheel with respect to the conventional solutions. The increase of rigidity may reach the order of 43%.

Finally, the elimination of the radial flanges greatly increases the wheel lightness.

In a preferred embodiment, at each end of the hub there are provided only six spokes. This arrangement with a reduced number of spokes with respect to the conventional solution having sixteen spokes gives rise to a reduction by 0.5% of the aerodynamical drag at a speed of 40 km/h.

In this preferred embodiment, at the end of the hub facing towards the sprockets for engagement of the bicycle chain, said cavities extend along a direction inclined with respect to a radial direction, so that the spokes are arranged to cross each other two by two, in order to bear the torsion effort transmitted by the powered sprocket.

According to a further preferred feature of the invention, between the head of each spoke and the respective abutment surface of the hub there is interposed a force distributing member.

In the case of the left end of the hub, which is more remote from the sprockets, this force distributing member may be formed for instance by a rectangular-shaped plate with a central tapered hole for supporting the spoke head. In the case instead of the end of the hub facing towards the sprockets, said force distributing member is a semi-cylindrical body which is received within an enlarged end of the respective cavity and has a tapered central hole for engagement of the spoke head.

According to a further preferred feature, the hub is provided with axial retaining means adapted to prevent said end portion of each spoke from moving axially out of the respective front cavity of the hub. At the hub end which is more remote from the sprockets, where the spokes extend radially with respect to the hub axis, said axial retaining means may be for example in the form of an annular edge projecting radially inwardly from the radially inner surface of the hub, so as to define a stop annular surface for the enlarged head of the spoke or for the force distributing member which is associated with the head. This stop edge does not hinder the mounting of the spokes on the hub, since the enlarged head of each spoke may be inserted into the respective cavity from the inside of the hub, with a radial movement which overcomes the obstacle defined by said stop edge, this radial movement being possible since the spokes are arranged according to radial directions with respect to the hub axis. At the hub end which is closer to the sprockets, where the spokes are arranged, for example to cross each other two by two, along directions tangential with respect to a theoretical cylinder coaxial with the hub, the enlarged head of each spoke, with the force distributing member associated therewith, must be inserted into the respective cavity of the hub with a movement having only an axial component, so that a stop edge of the above indicated type would hinder the mounting of the spoke. Therefore, in this case, according to the invention, the axial retaining means may be for example in form of a spring ring mounted on the hub, for example on the radially outer surface of the hub, so as to cooperate with the part of the end portion of the spoke which projects outwardly from the hub, so as to prevent said portion from moving out of the respective cavity.

BRIEF DESCRIPTION OF THE DRAWINGS

Further features and advantages of the invention will become apparent from the description which follows with reference to the annexed drawings, given purely by way of non limiting example, in which:

FIG. 3 is a view at an enlarged scale of a further detail of FIG. 1, FIG. 4 is a front view of the right end of the hub of FIG. 1, FIG. 5 is a perspective view at an enlarged scale of a detail of FIG. 3, FIG. 6 is a front view of the detail of FIG. 5.

DETAILED DESCRIPTION OF THE INVENTION

Figures 1, 2:
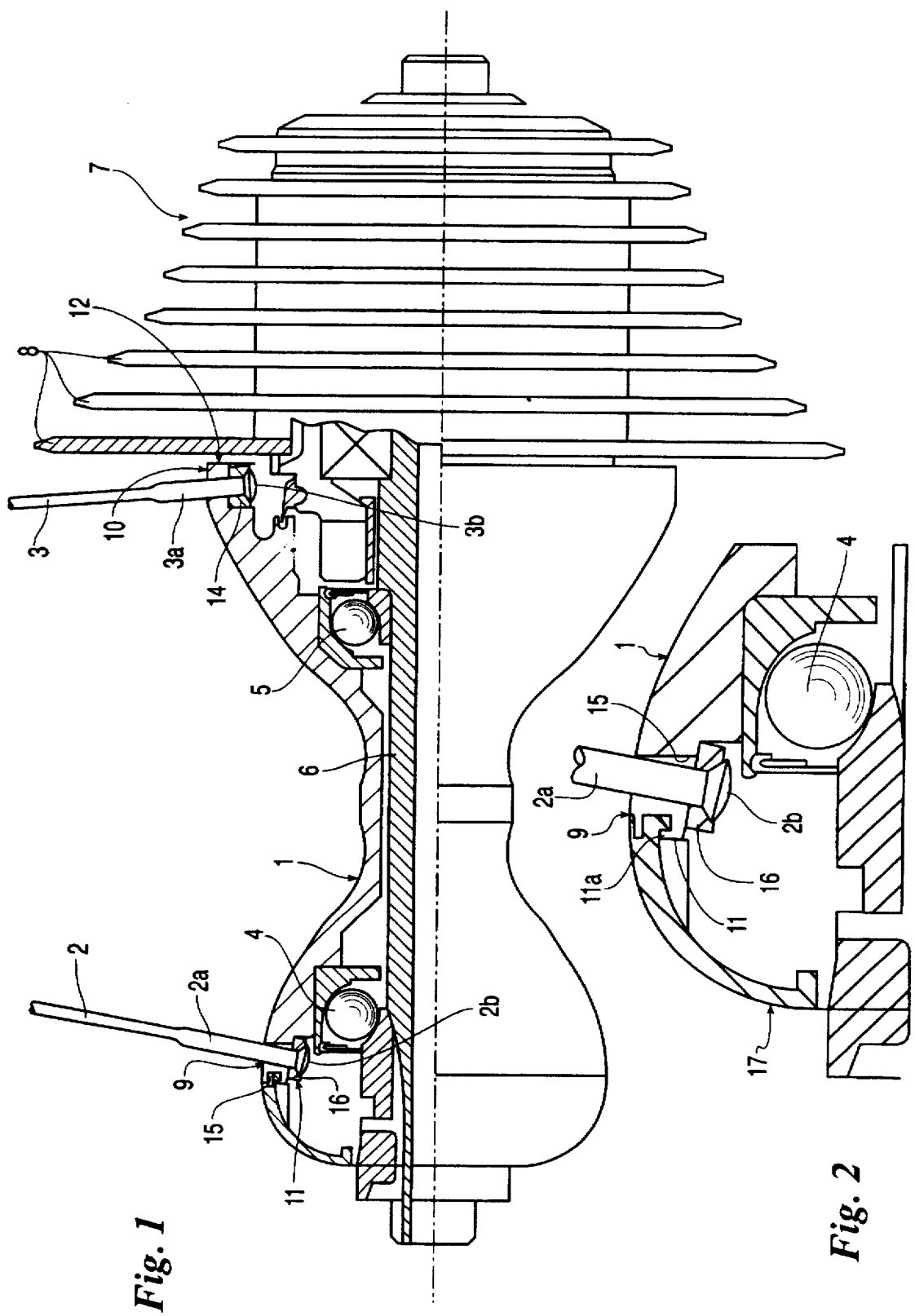
FIG. 1 is a view partially in cross-section of the hub of a wheel according to the invention.
FIG. 2 is a view at an enlarged scale of a detail of FIG. 1.

With reference to FIG. 1, reference numeral 1 generally designates a hub of a bicycle rear wheel whose ends are connected to the wheel rim (not shown) by means of two series of spokes 2, 3.

According to the conventional art, the hub 1 is rotatably mounted by bearings 4, 5 onto a shaft 6 which is to be fixed to the bicycle frame and carrying in the conventional way a free-wheel unit 7 provided with sprockets 8 which are for selectively engaging the bicycle chain.

As shown in the drawings, both ends of the hub 1 are deprived of radial flanges, and have two axial annular flanges 9, 10 having front annular surfaces 11, 12.

Furthermore, as shown, both series of spokes 2, 3 are arranged with straight end portions 2a, 3a, which are not bent in an elbow-like fashion.

Figure 7:
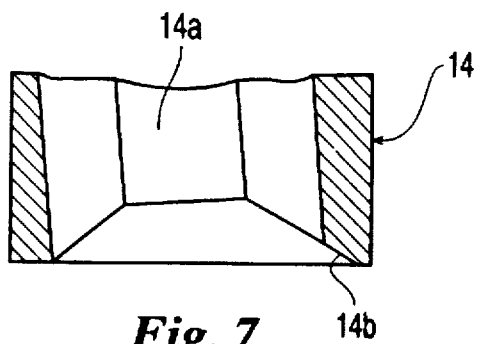
FIG. 7 is a view in cross-section taken along line VII—VII of FIG. 6.
Figure 8:
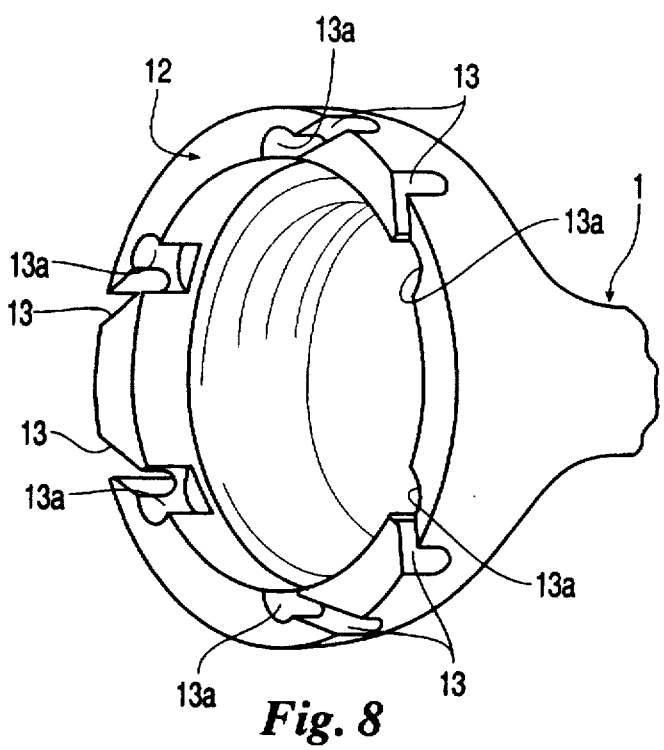
FIG. 8 is a perspective view of one end of the hub of FIG. 1.

As clearly shown in FIG. 8, the annular front surface 12 has a plurality of cavities 13 extending throughout the whole radial dimension of the annular surface 12. These cavities receive the respective end portions 3a of the spokes 3 (see also FIG. 4), terminating with an enlarged head 3b. The head 3b abuts against the inner surface of the axial flange 10 with the interposition of a force distributing member 14 having a semi-cylindrical body (FIGS. 5–7) which is received in an enlarged portion 13a (FIG. 8), semi-circular in cross-section, of each cavity 13. As clearly shown in FIG. 4, in the illustrated example, cavities 13 extend along a direction inclined with respect to a radial direction, so that the spokes 3, six in total in the illustrated example, are arranged to cross each other two by two. The semi-cylindrical body 14 has a central hole 14a for passage of the respective end portion 3a, with a tapered surface 14b for abutment of the head 3b. The hole 14a has two cavities 14c for passage of the spoke which has a flattened aerodynamical cross-section along its main portion.

Figure 9:
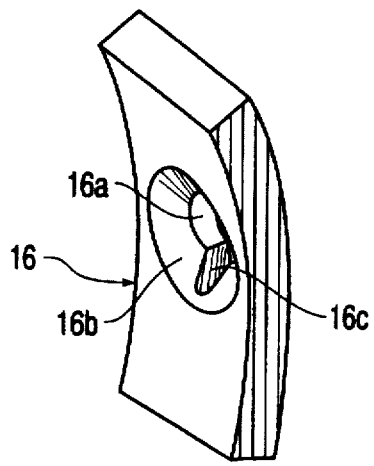
FIG. 9 is a perspective view at an enlarged scale of a detail of FIG. 2.
Figure 10:
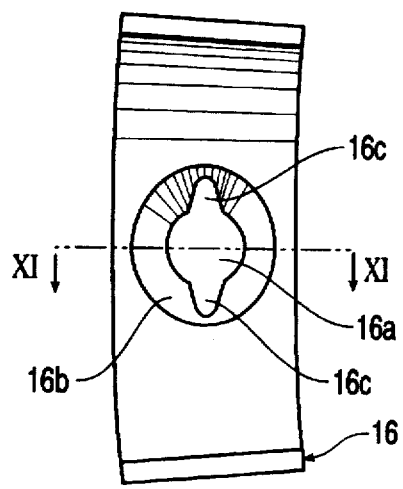
FIG. 10 is a cross-sectional view of the detail of FIG. 9.
Figure 11:
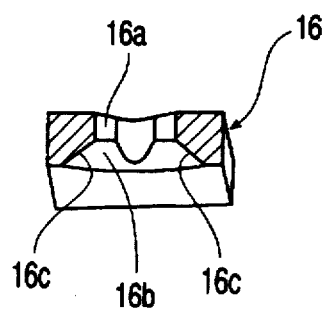
FIG. 11 is a view in cross-section taken along line XI—XI of FIG. 10.

At the opposite end, the hub 1 similarly has a plurality of cavities 15 formed from the annular end surface 11 and extending throughout the whole radial dimension of this surface. In this case, cavities 15 are directed radially, since spokes 2 do not cross each other. Each end portion 2a of a spoke 2 is received in a respective cavity 15 and its end head 2b abuts against the inner surface of the axial flange 9 with the interposition of a force distributing member 16 (FIGS. 9–11) which is rectangular-shaped, with a central hole 16a terminating with a tapered surface 16b and provided with two cavities 16c, corresponding to the shape of the spoke cross-section.

As shown, all spokes 2, 3 are connected to the hub with no need of providing elbow-like bent ends. All the spokes 3 are arranged in the same plane, at the maximum inclination allowed by the need of avoiding interference with sprockets 8. Therefore, a wheel with high aerodynamical performances and transverse rigidness is obtained. Also the weight of the wheel is greatly reduced due to the elimination of the end radial flanges of the hub, which are used in the conventional solutions. The provision of the cavities 13, 15 enables the wheel to be easily assembled, and the provision of the force distributing members 14, 16 ensures high strength characteristics and reliability. At the front surface 11 of the hub there is mounted a covering ring 17 having an edge fitted onto a respective edge 11a of the front surface 11.

Figure 12:
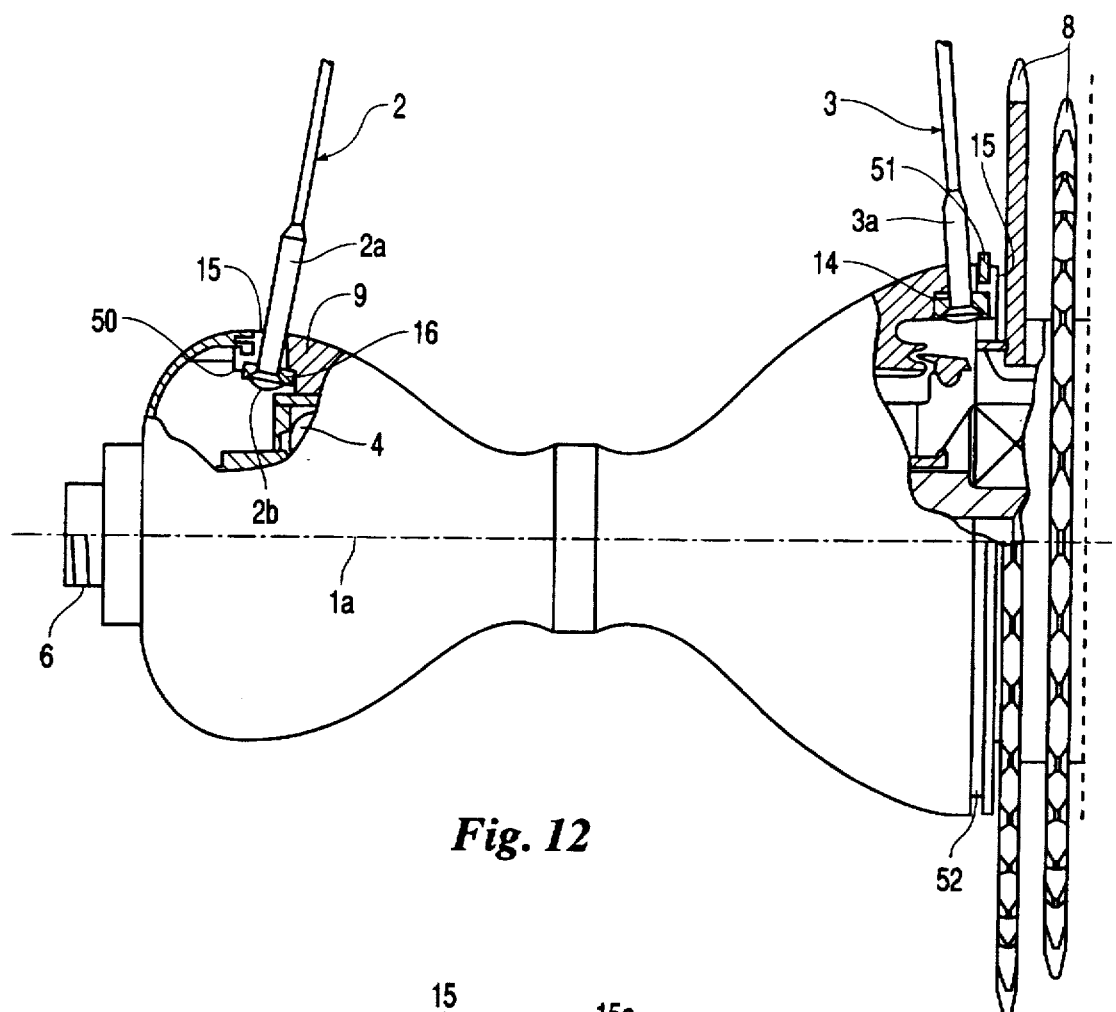
FIG. 12 shows a variant of FIG. 1.
Figure 13:
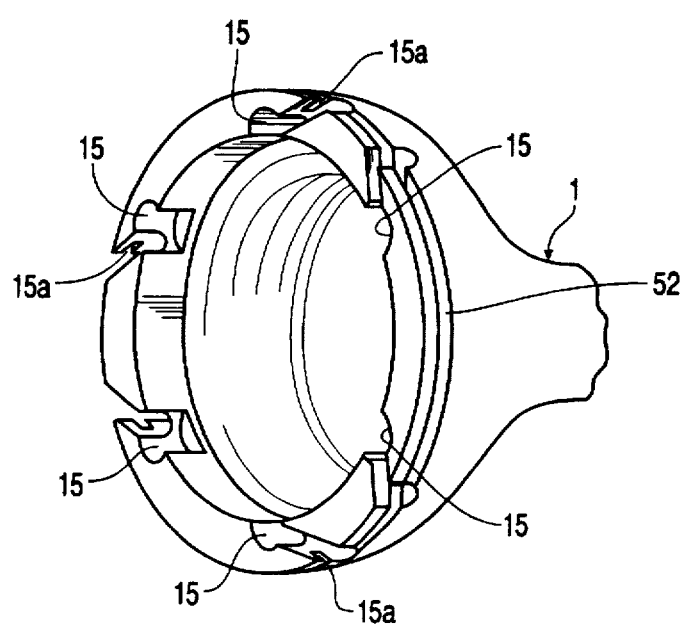
FIG. 13 is a variant of FIG. 8.

FIGS. 12, 13 show a variant of the invention in which axial retaining means are provided for preventing the end portions of the spokes from moving axially out of their respective cavities. In this case, the end of the hub which is remote from sprockets 8 has a stop edge 50 projecting radially inwardly from the inner surface of the annular flange 9 so as to define a stop surface for the force distributing member 16 which is associated with the enlarged head 2b of the end portion 2a of each spoke 2. Even in case the force distributing members 16 were not provided, the edge 50 could be provided for cooperation with the enlarged head 2b directly. The edge 50 does not hinder the assembly of the spokes on the hub, since the spokes 2 are all directed along radial directions with respect to axis 1a, so that each enlarged head 2b may be inserted into the respective cavity 15 by sliding the spoke from the inside through the cavity with a radial movement.

At the end of the hub closer to the sprockets 8, spokes 3 are arranged along directions inclined to the radial direction, so that a stop means of the type of stop edge 50 would hinder the proper mounting of the spokes. Therefore, the stop means are preferably in form of a spring ring 51 (FIG. 12)

which is inserted within a circumferential groove 52 (see also FIG. 13) formed on the outer surface of hub 1.

Due to these features, the mounting of the spokes on the hub is stable and safe while maintaining of the advantages of the solutions shown in FIGS. 1–11.

Naturally, while the principle of the invention remains the same, the details of construction and the embodiments may widely vary with respect to what has been described and illustrated purely by way of example, without departing from the scope of the present invention.

What is claimed is:

1. A bicycle rear wheel comprising a hub and two series of spokes for connecting opposite ends of the hub to a wheel rim, said opposite ends of said hub being provided with annular axially extending flanges having inner and outer surfaces for connection to the spokes, wherein each flange has an axially facing annular surface with a plurality of cavities extending inwardly from said annular surface and extending radially of the flange from said inner surface to said outer surface, wherein each spoke has a straight end portion received within a respective cavity and an enlarged head on said straight end portion disposed in an enlarged portion of each cavity located in the inner surface of the flange to prevent radial outward movement of said head, wherein said hub has at least one sprocket mounted on one end of said hub and said cavities in the flange adjacent said at least one sprocket extend along inclined directions with respect to a radial direction with the spokes arranged to cross each other two by two, and wherein said hub is provided with axial retaining means for preventing said end portion of each spoke from moving axially out of a respective cavity, said axial retaining means being comprised of a ring mounted on said hub for engagement with a part of the end portion of each spoke which projects outwardly of said hub, wherein a force distributing member is interposed between the head of each spoke and the respective enlarged portion of each cavity, wherein said force distributing member has a semi-cylindrical body disposed in said enlarged portion of each cavity, and wherein said enlarged portion of each cavity has a complementary semi-circular cross-section and said semi-cylindrical body has a tapered central hole for engagement with the head of a spoke.

2. A bicycle rear wheel as set forth in claim 1, wherein the spokes associated with each flange are arranged in the same plane.

3. A bicycle rear wheel as set forth in claim 1, wherein said force distributing member is a rectangular-shaped plate with a central tapered hole for supporting the head of the spoke.

4. A bicycle rear wheel as set forth in claim 1, wherein said axial retaining means is comprised of an annular edge of one of said flanges projecting radially inwardly from the inner surface of the flange.

5. A bicycle rear wheel as set forth in claim 1, wherein said ring is mounted in a groove formed in the outer surface of the flange.

* * * * *